(12) United States Patent
Kakumaru

(10) Patent No.: US 10,868,830 B2
(45) Date of Patent: Dec. 15, 2020

(54) NETWORK SECURITY SYSTEM, METHOD, RECORDING MEDIUM AND PROGRAM FOR PREVENTING UNAUTHORIZED ATTACK USING DUMMY RESPONSE

(71) Applicant: NEC Corporation, Tokyo (JP)

(72) Inventor: Takahiro Kakumaru, Tokyo (JP)

(73) Assignee: NEC CORPORATION, Tokyo (JP)

( * ) Notice: Subject to any disclaimer, the term of this patent is extended or adjusted under 35 U.S.C. 154(b) by 292 days.

(21) Appl. No.: 15/574,543

(22) PCT Filed: May 20, 2016

(86) PCT No.: PCT/JP2016/002461
§ 371 (c)(1),
(2) Date: Nov. 16, 2017

(87) PCT Pub. No.: WO2016/189841
PCT Pub. Date: Dec. 1, 2016

(65) Prior Publication Data
US 2018/0159897 A1 Jun. 7, 2018

(30) Foreign Application Priority Data
May 27, 2015 (JP) .................. 2015-107115

(51) Int. Cl.
*H04L 29/06* (2006.01)
*H04L 29/08* (2006.01)
(52) U.S. Cl.
CPC ...... *H04L 63/1491* (2013.01); *H04L 63/1425* (2013.01); *H04L 69/326* (2013.01)
(58) Field of Classification Search
CPC ............. H04L 63/1491; H04L 63/1425; H04L 69/326; H04L 63/20; H04L 63/1416; H04L 63/10; H04L 63/1433
See application file for complete search history.

(56) References Cited

U.S. PATENT DOCUMENTS

| 6,643,795 B1 * | 11/2003 | Sicola ................. G06F 11/2069 714/11 |
| 2002/0133606 A1 | 9/2002 | Mitomo et al. |
| 2004/0128529 A1 * | 7/2004 | Blake .................. H04L 63/1441 726/25 |
| 2006/0212942 A1 * | 9/2006 | Barford ............... H04L 63/1416 726/24 |

(Continued)

FOREIGN PATENT DOCUMENTS

| JP | 2002-342279 A | 11/2002 |
| JP | 2003-036243 A | 2/2003 |

(Continued)

OTHER PUBLICATIONS

"Java—The Enumeration Interface", Jul. 2014, tutorialspoint Java Programming, 2 pages (Year: 2014).*

(Continued)

*Primary Examiner* — Chau Le
*Assistant Examiner* — Han Yang

(57) ABSTRACT

Provided is a security system or the like with which security can be improved. A security system according to one embodiment of the present invention is provided with: a packet reception means that receives a request from an intruding device that is attempting intrusion; a dummy resource characteristic information storage means that stores characteristic information for a plurality of virtual dummy resources; a dummy response generation means that generates a dummy response on the basis of the characteristic information in response to the request directed to the dummy resource; a dummy response transmission control means that controls a request end flag, which indicates the presence/ absence of untransmitted dummy resources, on the basis of a timer value; and a dummy response transmission means that, on the basis of the request end flag, transmits the dummy response to the intruding device that transmits the request.

10 Claims, 11 Drawing Sheets

(56) References Cited

U.S. PATENT DOCUMENTS

| | | | | |
|---|---|---|---|---|
| 2007/0067841 | A1* | 3/2007 | Yegneswaran | H04L 63/1416 726/23 |
| 2008/0018927 | A1* | 1/2008 | Martin | G06F 21/74 358/1.15 |
| 2008/0052359 | A1* | 2/2008 | Golan | G06Q 10/107 709/206 |
| 2009/0013054 | A1* | 1/2009 | Libbey | G06Q 10/107 709/207 |
| 2012/0254951 | A1* | 10/2012 | Munetoh | G06F 21/554 726/4 |
| 2014/0101724 | A1* | 4/2014 | Wick | H04L 63/1491 726/4 |
| 2014/0337836 | A1* | 11/2014 | Ismael | G06F 9/455 718/1 |
| 2014/0359769 | A1* | 12/2014 | Sabin | G06F 21/554 726/23 |
| 2016/0119377 | A1* | 4/2016 | Goldberg | G06F 17/27 726/12 |

FOREIGN PATENT DOCUMENTS

| | | | |
|---|---|---|---|
| JP | 2005-4617 | A | 1/2005 |
| JP | 2005-84820 | A | 3/2005 |
| JP | 2008-236415 | A | 10/2008 |
| JP | 2008-306610 | A | 12/2008 |
| WO | 2009/032379 | A1 | 3/2009 |
| WO | 2016/031103 | A1 | 3/2016 |

OTHER PUBLICATIONS

Takahiro Kakumaru, et al., "A Simulative Deception Method against Targeted Attack Activities on Intranet," Computer Security Symposium 2014, Oct. 24, 2014, pp. 735 to 742.

International Search Report for PCT Application No. PCT/JP2016/002461, dated Jul. 26, 2016.

English translation of Written opinion for PCT Application No. PCT/JP2016/002461.

Takahiro Kakumaru et al., "Deceptive Defense Architecture toward Protection against APT", The Institute of Electronics, Information and Communication Engineers, IEICE Technical Report, Jul. 2014, (Retrieved on Nov. 18, 2019), vol. 114, No. No. 118 pp. 69-74 (total 7 pages).

Communication dated Oct. 15, 2019 from Japanese Patent Office in counterpart JP Application No. 2017-520228.

* cited by examiner

Fig.4A

```
⊞ SMB Header
⊟ Trans2 Response (0x32)
    Subcommand: QUERY_PATH_INFO (0x0005)
    [Level of Interest: Query File Basic Info (1004)]
    [File Name: ]
    Word Count (WCT): 10
    Total Parameter Count: 2
    Total Data Count: 40
    Reserved: 0000
    Parameter Count: 2
    Parameter Offset: 56
    Parameter Displacement: 0
    Data Count: 40
    Data Offset: 60
    Data Displacement: 0
    Setup Count: 0
    Reserved: 00
    Byte Count (BCC): 45
    Padding: 00
  ⊟ QUERY_PATH_INFO Parameters
        EA Error offset: 0
     Padding: 0000
  ⊟ QUERY_PATH_INFO Data
        Created: Not representable
        Last Access: Dec  7, 2014 05:58:30.000728100
        Last Write: Jul 22, 2008 12:39:30.000728900
        Change: Sep 26, 2013 09:39:30.000729600
     ⊞ File Attributes: 0x00000010
        Unknown Data: 00000000
```

Fig.4B

- SMB Header
- Trans2 Response (0x32)
    Subcommand: QUERY_PATH_INFO (0x0005)
    [Level of Interest: Query File Standard Info (1005)]
    [File Name: ]
    Word Count (WCT): 10
    Total Parameter Count: 2
    Total Data Count: 24
    Reserved: 0000
    Parameter Count: 2
    Parameter Offset: 56
    Parameter Displacement: 0
    Data Count: 24
    Data Offset: 60
    Data Displacement: 0
    Setup Count: 0
    Reserved: 00
    Byte Count (BCC): 29
    Padding: 00
  - QUERY_PATH_INFO Parameters
      EA Error offset: 0
      Padding: 0000
  - QUERY_PATH_INFO Data
      Allocation Size: 0
      End Of File: 0
      Link Count: 1
      Delete Pending: Normal, no pending delete (0)
      Is Directory: This is a DIRECTORY (1)
      Unknown Data: 0000

Fig.4C

- SMB Header
- Trans2 Response (0x32)
    Subcommand: QUERY_FS_INFO (0x0003)
    [Level of Interest: Query FS Attribute Info (0x0105)]
    Word Count (WCT): 10
    Total Parameter Count: 0
    Total Data Count: 20
    Reserved: 0000
    Parameter Count: 0
    Parameter Offset: 56
    Parameter Displacement: 0
    Data Count: 20
    Data Offset: 56
    Data Displacement: 0
    Setup Count: 0
    Reserved: 00
    Byte Count (BCC): 21
    Padding: 00
    - QUERY_FS_INFO Data
        - FS Attributes: 0x0001002f
            Max name length: 255
            Label Length: 8
            FS Name: NTFS

Fig.4D

- SMB Header
- Trans2 Response (0x32)
    - Subcommand: QUERY_FS_INFO (0x0003)
    - [Level of Interest: Query FS Volume Info (0x0102)]
    - Word Count (WCT): 10
    - Total Parameter Count: 0
    - Total Data Count: 26
    - Reserved: 0000
    - Parameter Count: 0
    - Parameter Offset: 56
    - Parameter Displacement: 0
    - Data Count: 26
    - Data Offset: 56
    - Data Displacement: 0
    - Setup Count: 0
    - Reserved: 00
    - Byte Count (BCC): 27
    - Padding: 00
    - QUERY_FS_INFO Data
        - Created: No time specified (0)
        - Volume Serial Number: 0xd713a63c
        - Label Length: 8
        - Reserved: 0000
        - Label: Work

Fig.4E

```
⊞ SMB Header
⊟ Trans2 Response (0x32)
    Subcommand: FIND_FIRST2 (0x0001)
    [Level of Interest: Find File Full Directory Info (258)]
    [Search Pattern: \*]
    Word Count (WCT): 10
    Total Parameter Count: 10
    Total Data Count: 778
    Reserved: 0000
    Parameter Count: 10
    Parameter Offset: 56
    Parameter Displacement: 0
    Data Count: 778
    Data Offset: 68
    Data Displacement: 0
    Setup Count: 0
    Reserved: 00
    Byte Count (BCC): 791
    Padding: 00
  ⊟ FIND_FIRST2 Parameters
      Level of Interest: Find File Full Directory Info (258)
      Search ID: 0xb353
      Search Count: 9
      End Of Search: 0
      EA Error offset: 0
      Last Name Offset: 146
    Padding: 0000
  ⊟ FIND_FIRST2 Data
    ⊞ Find File Full Directory Info File: .
    ⊞ Find File Full Directory Info File: ..
    ⊞ Find File Full Directory Info File: Default
    ⊞ Find File Full Directory Info File: 7-zip32
    ⊞ Find File Full Directory Info File: genl-vmode10g
    ⊞ Find File Full Directory Info File: ThumbIcon.png
    ⊞ Find File Full Directory Info File: Readme_ja.txt.icf
    ⊞ Find File Full Directory Info File: zh-CN.html
    ⊞ Find File Full Directory Info File: enlarge.png
```

NETWORK SECURITY SYSTEM, METHOD, RECORDING MEDIUM AND PROGRAM FOR PREVENTING UNAUTHORIZED ATTACK USING DUMMY RESPONSE

This application is a National Stage Entry of PCT/JP2016/002461 filed on May 20, 2016, which claims priority from Japanese Patent Application 2015-107115 filed on May 27, 2015, the contents of all of which are incorporated herein by reference, in their entirety.

TECHNICAL FIELD

The present invention relates to a network security technology.

BACKGROUND ART

As an example of a honeypot, PTL 1 describes an unauthorized intrusion prevention system guiding unauthorized access to a virtual decoy server. A decoy area in a hard disk is allocated to the virtual decoy server. The decoy area has a same directory structure as that of a regular area allocated to a virtual regular server. For example, the decoy area is generated by copying the regular area allocated to the virtual regular server. The unauthorized intrusion prevention system in PTL 1 guides access by an unauthorized penetrator to the virtual decoy server.

A honeytoken is a type of honeypot and is positioned as a type of honeypot not being a computer system. The honeytoken is electronic information made of false information generated for a purpose not primarily used for a normal use. Purposeful use of a honeytoken made of false information is used for a purpose of detecting unintended unauthorized use, and the like.

An example of the honeytoken is a false e-mail address. The false e-mail address is used for tracing whether or not a mailing list is stolen. Other examples of the honeytoken include a credit card number, office documents, database entry, and a combination of a login identification (ID) and a password. All these honeytokens are deployed in cyberspace on the assumption of not primarily being used, and are used for catching an attacker exhibiting improper behavior in cyberspace, and the like.

CITATION LIST

Patent Literature

[PTL 1] Japanese Unexamined Patent Application Publication No. 2003-036243

SUMMARY OF INVENTION

Technical Problem

Since a honeytoken is primarily false information that is not used for a justifiable reason and is not secret, even when a honeytoken is deployed in an organization and acquired by a cyberattacker intruding inside the organization, there should primarily be no influence on the organization. However, when it is difficult to determine whether the information acquired by the attacker is true information or false information, a reputation that true information is leaked out spreads to the public, and there is a fear that brand power of the organization degrades.

In the unauthorized intrusion prevention system in PTL 1, an unauthorized penetrator guided by a virtual decoy server is able to access a decoy area in a hard disk. That is to say, the unauthorized penetrator is able to acquire information from the decoy area. In the unauthorized intrusion prevention system in PTL 1, it is difficult for the unauthorized penetrator to determine whether or not the information acquired by the unauthorized penetrator is true information.

It is difficult to prevent an unauthorized intrusion through a network, and a security cost increases in order to prevent malware from infecting a system. For example, deletion or protection repeated every time an external unauthorized intrusion (i.e. an attack) is detected increases a protection cost.

In particular, in offense and defense in cyberspace, an attacker is able to attack from anywhere, whereas a defender needs to defend against any attack from anywhere. A failure by the attacker is overlooked, whereas a failure by the defender is not excused, and the defender must securely defend every attack. The attacker is able to have an insight into a protective network at a small cost, whereas it takes an enormous cost for the defender to maintain network security. Additionally, the attacker is likely to enjoy technical and organizational benefits in cyberspace, whereas the defender is likely to be influenced by innovation.

As described above, from the nature of cybersecurity, the attacker has superiority over the defender. Accordingly, in order to improve network security, it is important to increase cost advantage on the defense side by increasing an attack cost. In other words, security can be improved by providing defense in depth that minimizes damage while causing the attacker to incur a larger attack cost.

For example, it is important to minimize influence of an attack on the assumption that a system is infected by malware. Leakage of important data such as intellectual property over a network causes serious damage. Accordingly, it is important to prevent leakage of important data caused by an unauthorized intrusion.

An object of the present invention is to provide a security system and the like that are capable of improving security.

Solution to Problem

A security system according to an aspect of the present invention includes: packet reception means for receiving a request from an intruding device attempting an intrusion; dummy resource characteristic information storage means for storing characteristic information of virtual dummy resources; dummy response generation means for generating, based on the characteristic information, a dummy response in response to the request to the dummy resources; dummy response transmission control means for controlling, based on a timer value, a request end flag indicating presence or absence of the dummy resources not transmitted by the dummy response; and dummy response transmission means for transmitting the dummy response to the intruding device that transmits, based on the request end flag, the request.

A security method according to an aspect of the present invention includes: receiving a request from an intruding device attempting an intrusion; generating, based on characteristic information of virtual dummy resources, a dummy response in response to the request to the dummy resources; controlling, based on a timer value, controlling a request end flag indicating presence or absence of the dummy resources not being transmitted; and transmitting the dummy response to the intruding device that transmits, based on the request end flag, the request.

A storage medium according to an aspect of the present invention stores a program causing a computer to perform: packet reception processing of receiving a request from an intruding device attempting an intrusion; dummy response generation processing of generating, based on characteristic information of virtual dummy resources, a dummy response in response to the request to the dummy resources; dummy response transmission control processing of controlling, based on a timer value, a request end flag indicating presence or absence of the dummy resources not being transmitted; and dummy response transmission processing of transmitting the dummy response to the intruding device that transmits, based on the request end flag, the request. An aspect of the present invention is also provided by the aforementioned program.

Advantageous Effects of Invention

The present invention is able to improve security.

DESCRIPTION OF EMBODIMENTS

Referring to attached drawings, example embodiments of the present invention will be described. Example embodiments described below are examples, and the present invention is not limited to the following example embodiments. Note that, in the following description and drawings, components given with identical reference signs represent identical components.

A security system and a security method, according to the present example embodiments, improve security, based on defense in depth. For example, a cyber kill chain includes attacking steps such as intelligence, invasion, concealment, bridgehead acquisition, reconnaissance, penetration, occupation, exploitation, and withdrawal. While there are several other types of expressions of attacking steps in a cyber kill chain, basic attacking steps are similar and are not limited to the description herein. The security system according to the present example embodiment sets various deceptions in each attacking step. For example, the security system generates a virtual directory group and a virtual file group (mimic deception) and provides an attacker with vague information, false information, or obscure information in a reconnaissance step and an exploitation step. Behavior of a malicious attacker can be hindered or guided in such a way to increase an attack cost for achieving a purpose. In other words, an attack cost of the attacker for reaching important data can be increased. For example, the attack cost includes time, money, a resource, research, information, labor, and a thing but is not limited thereto. Leakage of important data such as intellectual property can be prevented.

First Example Embodiment

Figure 1:
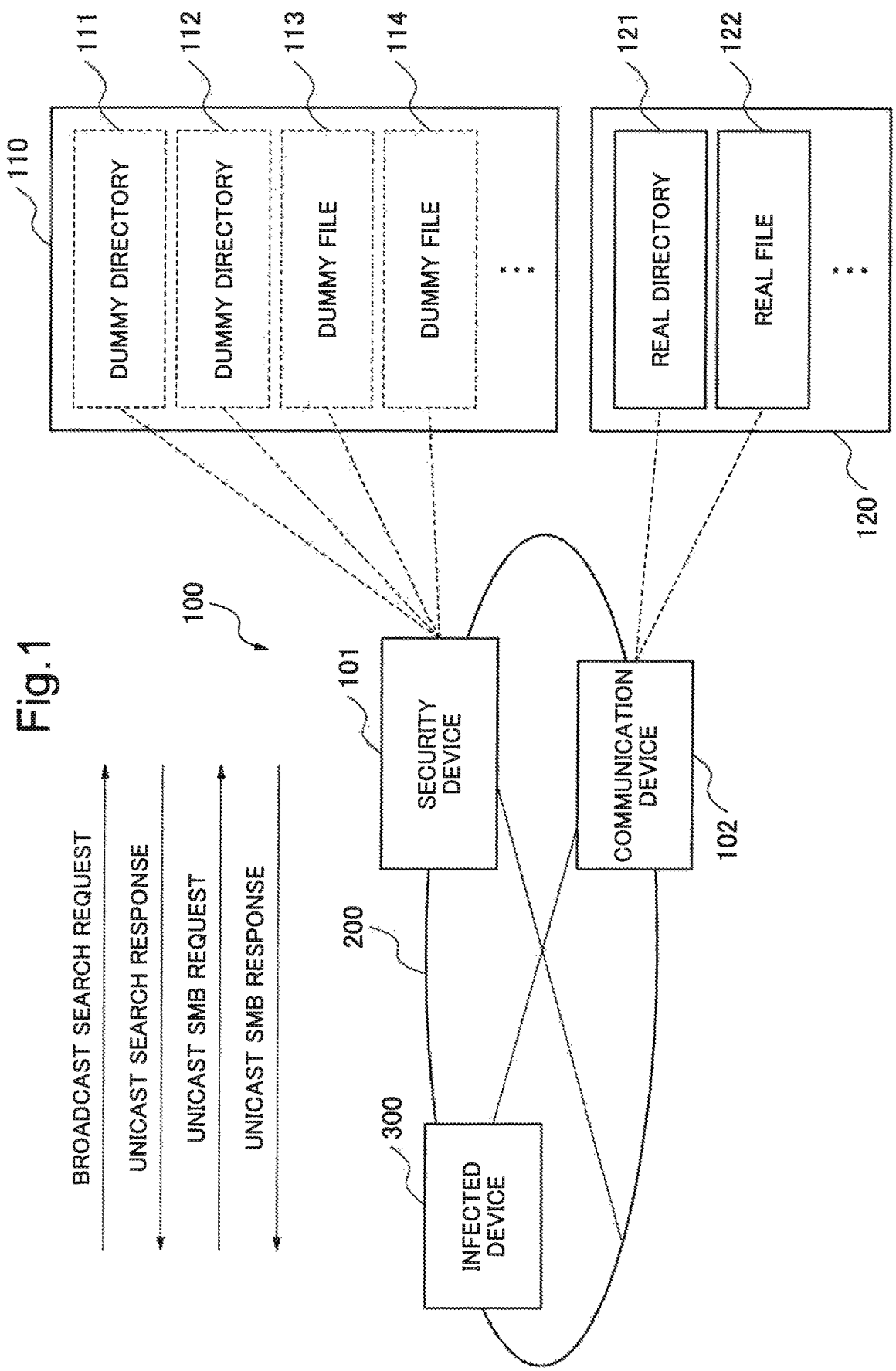
FIG. 1 is a block diagram illustrating an entire configuration of a security system.

A security system 100 according to a first example embodiment of the present invention based on the concept described above will be described. FIG. 1 is a block diagram illustrating an entire configuration of the security system 100 according to the present example embodiment. The security system 100 includes a security device 101, a dummy shared network resource 110, a communication device 102, a shared network resource 120, and a network system 200. The security device 101, the dummy shared network resource 110, the communication device 102, and the shared network resource 120 are communicably connected to one another through the network system 200 being a communication network. Additionally, an infected device 300 is connected to the network system 200, as an attacker. The network system 200 is a communication network such as a local area network (LAN), a wide area network (WAN), and the Internet.

The communication device 102 is an actually existing communication device (e.g. a host device, a computer, or a communication terminal) and retains the shared network resource 120 available from a communication device connected to the network system 200. The shared network resource 120 includes a plurality of real directories 121 and a plurality of real files 122. The real directories 121 and the real files 122 are resources shared in the network (e.g. shared network resource 120), that is, shared network resources implemented using existent directories and files. While FIG. 1 illustrates one real directory 121 and one real file 122, the number of the real directories 121 and the number of the real files 122 are not particularly limited, respectively.

The real directory 121 and the real file 122 are, for example, a directory and a file that are generated on a disk of a computer, and are implemented based on a file system on an operating system (OS) such as Windows (registered trademark) and Linux (registered trademark).

The security device 101 generates the dummy shared network resource 110. The dummy shared network resource 110 is configured so as to include a plurality of dummy directories 111 and 112, and a plurality of dummy files 113 and 114. The dummy directories 111 and 112, and the dummy files 113 and 114 are resources (i.e. virtual shared network resources) shared over a virtual network, that is, virtual shared network resources configured so as to include nonexistent directories and files. The security device 101 generates the dummy shared network resource 110 on the basis of communication using a message similar to that used when the communication device 102 responds to a resource list acquisition request to the shared network resource 120. More specifically, it is provided by utilizing part of messages required for handling the shared network resource. The security device 101 sets various deceptions and pretends as though the dummy shared network resource 110 that does not actually exist, that is, the dummy directories 111 and 112, and the dummy files 113 and 114, were existent.

The security device 101 can be achieved by real hosts that actually exist. For example, the security device 101 performs a security method according to the present example embodiment by a network security program installed on the security device 101. The security device 101 may be a dedicated computer and may be provided by using a computer included in the network system 200 as a host. The security device 101 is not limited to a physically single device. The security device 101 may be achieved by a plurality of devices.

The generation of the dummy directories 111 and 112, and the dummy files 113 and 114 as deceptions by the security device 101 increases an attack cost for the infected device 300 to steal important data. Since the security device 101 virtually generates the dummy directories 111 and 112, and the dummy files 113 and 114, the number of the dummy directories and the dummy files can be increased at a low cost. By generating a large number of the dummy directories 111 and 112, and the dummy files 113 and 114, the attacker is more likely to be deceived. The number of the dummy directories 111 and 112, and the dummy files 113 and 114 that are generated by the security device 101 is not particularly limited. The security device 101 is able to unlimitedly generate the dummy directories 111 and 112, and the dummy files 113 and 114. By the security device 101 generating more dummies, the attack cost can be increased.

Furthermore, the dummy directories 111 and 112, and the dummy files 113 and 114 that are generated by the security device 101 may be configured to exist on a same network resource or may be configured to exist on different network resources, respectively. In this case, for example, the dummy directories 111 and 112, and the dummy files 113 and 114 may be configured in such a way that the dummy directory 111 and the dummy file 113 exist on a host A, and the dummy directory 112 and the dummy file 114 exist on a host B. In this case, for example, the dummy directories 111 and 112, and the dummy files 113 and 114 appear to exist as ¥¥host-A¥doc¥directory111, ¥¥host-A¥doc¥file113.txt, ¥¥host-B¥doc¥directory112, and ¥¥host-B¥doc¥file114.txt, respectively.

The security system 100 according to the present example embodiment blocks an unauthorized intrusion from the infected device 300. For example, the infected device 300 is a communication device (host) infected with malware. The infected device 300 attempts an unauthorized intrusion into the network system 200 by external remote control. The infected device 300 attempts to steal, for example, important data in the real directory 121, the real file 122, and the like from the shared network resource 120 deployed in the communication device 102 included in the network system 200, and the like. Note that an intruding device attempting an unauthorized intrusion into the network system 200 is not limited to the infected device 300 infected with malware. The intruding device may be an external communication device connected through an external network such as the Internet.

The security device 101, the infected device 300, and the communication device 102 are communicably connected through the network system 200. The security device 101 or the communication device 102 may be connected to the network system 200 through a firewall.

Figure 2:
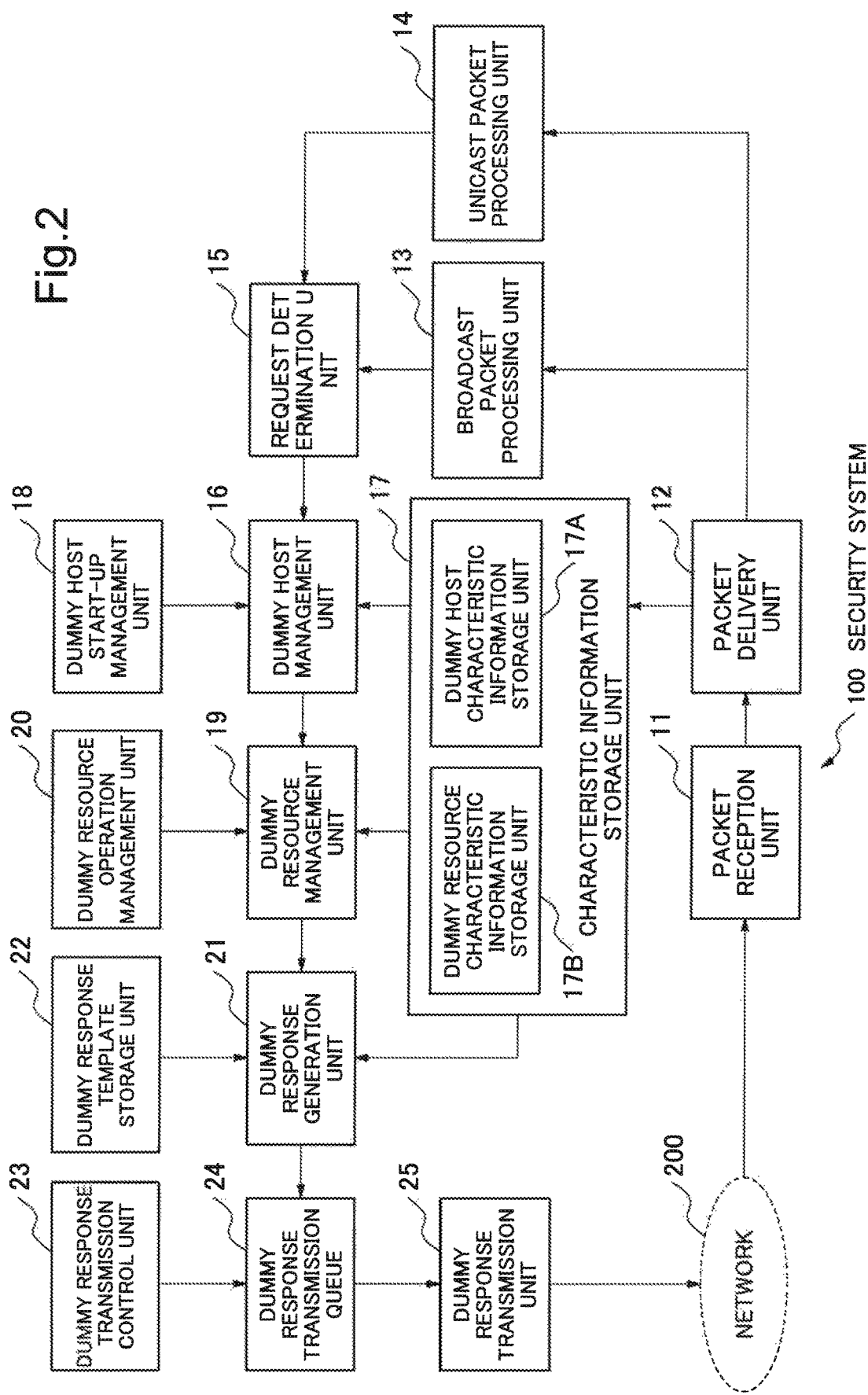
FIG. 2 is a block diagram illustrating a configuration of a security device according to a first example embodiment of the present invention.

Next, using FIG. 2, a configuration of the security device 101 will be described. FIG. 2 is a block diagram schematically illustrating the configuration of the security device 101. The security device 101 includes a packet reception unit 11, a packet delivery unit 12, a broadcast packet processing unit 13, a unicast packet processing unit 14, a request determination unit 15, a dummy host management unit 16, a characteristic information storage unit 17, a dummy host characteristic information storage unit 17A, a dummy resource characteristic information storage unit 17B, a dummy host start-up management unit 18, a dummy resource management unit 19, a dummy resource operation management unit 20, a dummy response generation unit 21, a dummy response template storage unit 22, a dummy response transmission control unit 23, a dummy response transmission queue 24, and a dummy response transmission unit 25. Processing in each unit will be described below.

The packet reception unit 11 receives a packet flowing through the network system 200. The packet reception unit 11 receives a packet when a destination address of the packet is a predetermined address. The packet reception unit 11 receives a packet from the infected device 300 attempting an unauthorized intrusion.

The packet delivery unit 12 determines a type of a reception packet received by the packet reception unit 11. Specifically, the packet delivery unit 12 determines whether the packet is a broadcast packet or a unicast packet. Then, the packet delivery unit 12 delivers a broadcast packet to the broadcast packet processing unit 13 and delivers a unicast packet to the unicast packet processing unit 14. The packet delivery unit 12 refers to the characteristic information storage unit 17 and identifies whether a destination address is included in addresses of hosts pretending that the dummy shared network resource 110 is deployed therein.

The unicast packet is a packet for performing one-to-one data communication by specifying a single address. The broadcast packet is a packet for performing one-to-many-and-unspecified data communication by specifying a broadcast address. Destinations of a broadcast packet received by the packet reception unit 11 includes the communication device 102 and every dummy host in which the dummy shared network resource virtually mimicked by the security device 101 is deployed. In that case, a message included in the broadcast packet targets every dummy host. For example, the infected device 300 attempts to acquire information about the communication device 102 on the network system 200 by transmitting a broadcast packet.

The packet delivery unit 12 may determine whether a packet received by the packet reception unit 11 is a broadcast packet, or a unicast packet or a multicast packet. For example, when receiving a multicast packet, the packet delivery unit 12 may deliver the multicast packet to the broadcast packet processing unit 13. Then, the broadcast packet processing unit 13 may process the multicast packet. Additionally, the security device 101 may include a multicast packet processing unit. The multicast packet is a packet for performing one-to-multiple data communication.

Specifically, the infected device 300 transmits a broadcast packet including a search message such as a search for a communication device (e.g. a host) and a search for a network resource, as a broadcast search request (referring to FIG. 1). For example, the search request message is a Network Basic Input Output System (NetBIOS) Name Service (NBNS) message. Then, the communication device 102 or a dummy host in which a shared network resource virtually generated by the security device 101 is deployed transmits a response to the search request, as a unicast search response, to the infected device 300. Subsequent to completion of the search, the infected device 300 transmits a unicast negotiation request to a specific host. For example, the request message is a Server Message Block (SMB). A dummy host managed by the security device 101, or the communication device 102 transmits a unicast negotiation response to the infected device 300.

More specifically, in response to the response to the previous broadcast search request, the infected device 300 transmits a unicast negotiation request. While the example in FIG. 1 illustrates only one unicast negotiation, the negotiations may be performed correspondingly to the number of hosts. In the configuration in FIG. 1, when the infected device 300 receives six unicast search responses from the communication device 102 and the dummy hosts managed by the security device 101, unicast negotiations are performed on all the six requests in a sequential order. Additionally, a plurality of sequences may be performed on one host. In that case, the plurality of sequences are performed for the number of times corresponding to the number of hosts. Then, when a session is established, the infected device 300 attempts file sharing and the like with the host device. Specifically, the infected device 300 attempts file sharing by a Server Message Block (SMB). Thus, the infected device 300 attempts to steal data.

The broadcast packet processing unit 13 passes a received broadcast packet to the dummy host management unit 16 as is. The unicast packet processing unit 14 determines whether a unicast packet is a transmission control protocol (TCP) packet or a user datagram protocol (UDP) packet. In a case of a TCP packet, the unicast packet processing unit 14 performs a three-way handshake and passes a payload to the search request determination unit 15. On the other hand, in a case of a UDP packet, the unicast packet processing unit 14 passes the UDP packet as is to the dummy host management unit 16.

The request determination unit 15 determines whether or not a received packet (i.e. a reception packet) includes a search request. For example, the request determination unit 15 determines whether a message included in the reception packet is a message of a search such as a search for a communication device (e.g. host device) and a search for a network service, or a message for acquiring information details of a negotiation in a session, and the like. The search request determination unit 15 determines whether a TCP packet payload includes a message pertaining to a search.

When a message pertaining to a search is included in the reception packet, the request determination unit 15 determines that a search request exists. Then, the request determination unit 15 causes the dummy host management unit 16 to pass the message pertaining to a search as a search request. Thus, the request determination unit 15 determines whether or not a message included in the reception packet is a search-type message (search request) with respect to the search request. Then, the request determination unit 15 causes only a predetermined message to be passed and causes any other type of request message not to be passed. For example, the request determination unit 15 causes a message requesting a file list to be passed but, on the other hand, causes a message requesting file sharing not to be passed. By the request determination unit 15 having such a determination function and filtering function, leakage of important data can be prevented.

For example, the request determination unit 15 determines whether or not a search request exists by using a white list. That is to say, the request determination unit 15 causes the dummy host management unit 16 to pass only a message preregistered in the list, as a search request. Thus, a malicious attack can be filtered, and security can be enhanced.

The white list may be set in combination with various types of characteristic information of a dummy host. By changing a message to be passed using the list setting individually for each dummy host and the like, reachability of a successful sequence changes individually for each dummy host. Accordingly, a more deceitful deception can be set.

The dummy host management unit 16 manages a mimicking dummy host, based on start-up information from the dummy host start-up management unit 18. That is to say, the dummy host management unit 16 determines whether or not a dummy host makes a dummy response. For example, when there is a request to an active dummy host, the dummy host management unit 16 determines to make a response. On the other hand, the dummy host management unit 16 determines not to make a dummy response regarding an inactive dummy host. An example that a dummy host A is started will be described below.

Furthermore, by referring to the characteristic information storage unit 17, the dummy host management unit 16 determines whether or not to make a response based on the search request. For example, the dummy host management unit 16 identifies a dummy host making a response, based on a destination address included in a reception packet. That is to say, the dummy host management unit 16 determines that a dummy host having an address matching a destination address included in the reception packet makes a response. When receiving a broadcast packet, the dummy host management unit 16 determines that every active dummy host makes a response.

Furthermore, when a packet includes a search request, the dummy host management unit 16 determines that a dummy host being a target of the search request makes a dummy response. By referring to a destination address of the packet, the dummy host management unit 16 determines whether or not a dummy host is a target of the search request. The dummy host management unit 16 determines whether or not a dummy host makes a response, based on a comparison result between the destination address and characteristic information, and a determination result by the request determination unit 15. The dummy host management unit 16 determines necessity or unnecessity for making a response, for each active dummy host individually.

When an active dummy host receives a search request, the dummy host management unit 16 determines to cause the dummy host to make a dummy response as though the dummy host existed. On the other hand, the dummy host management unit 16 determines not to make a dummy response when the dummy host is not active, when a packet does not include a search request, and when the dummy host is not a target of the search request. Regarding an inactive dummy host, the dummy host management unit 16 stops the dummy host from responding. Additionally, regarding an active dummy host not receiving a search request, the dummy host management unit 16 causes the dummy host not to make a dummy response. The dummy host management unit 16 determines that a response needs to be made with respect to every active dummy host being a target of the search request.

An external request to the dummy host start-up management unit 18 may be provided by a setting file, an application programming interface (API), an interface (IF), and the like. For example, the setting file is preset schedule data to which, for example, start time and stop time are set individually for each dummy host. The security device 101 may store the setting file. The dummy host start-up management unit 18 may manage start-up of a dummy host in such a way that, in accordance with a request from a communication device existing on the network system 200, in synchronization with power-ON and OFF timings of the communication device, the dummy host is started with a power-OFF state, and the dummy host is stopped with a power-ON state.

An example of management by the dummy host start-up management unit 18 will be described below. It is assumed here that a same address or the like that of as a communication device is registered for a dummy host in the characteristic information storage unit 17. For example, information for constructing a dummy host associated with the communication device is stored in the dummy host start-up management unit 18, in advance or by request. That is to say, characteristic information being a copy of management information of the communication device is set to the dummy host. In this case, when the communication device is powered ON, the dummy host start-up management unit 18 stops running of the dummy host. On the other hand, when the communication device is powered OFF, the dummy host start-up management unit 18 starts the dummy host. In other words, the dummy host start-up management unit 18 performs an instruction of start-up of the dummy host at a shutdown timing of the communication device. On the other hand, the dummy host start-up management unit 18 performs an instruction of a stop of the dummy host at a start-up timing of the communication device.

Thus, triggered by a power-ON state of the communication device, the dummy host start-up management unit 18 stops the dummy host. Triggered by a power-OFF state of the communication device, the dummy host start-up management unit 18 starts the dummy host. Even in a situation that the communication device is detached from the network system 200, the dummy host exists on the network system 200. Consequently, a deception more likely to deceive an attacker can be set. It looks as though the communication device existed from the viewpoint of the infected device 300. Thus, the dummy host start-up management unit 18 may manage start-up of the dummy host, based on whether or not the communication device is active.

The characteristic information storage unit 17 includes the dummy host characteristic information storage unit 17A storing information about dummy hosts, and the dummy resource characteristic information storage unit 17B storing information about dummy resources. The dummy host characteristic information storage unit 17A stores characteristic information of a plurality of virtual dummy hosts. The characteristic information is information required of a dummy host for mimicking, and is set individually for each dummy host. For example, the dummy host start-up management unit 18 manages start-up of a dummy host on the basis of characteristic information. The dummy host management unit 16 manages a dummy host on the basis of characteristic information. The dummy host management unit 16 and the dummy host start-up management unit 18 have been described above.

For example, the characteristic information includes a computer name (or a NetBIOS name), an IP address, a MAC address, a domain name, an OS information (e.g. an OS name and an OS version), a group name, and a network management name. As a matter of course, the aforementioned information is an exemplification. Accordingly, the characteristic information may include information other than that described above, and part of the aforementioned information may not be included. For example, the dummy host characteristic information storage unit 17A stores characteristic information of a plurality of dummy hosts as a table. The dummy host characteristic information storage unit 17A may store a network distance of a dummy host individually for each dummy host. The dummy host characteristic information storage unit 17A stores characteristic information equivalent to network management information of a communication device, as characteristic information of a dummy host.

Furthermore, a dummy host having management information identical to information that a communication device has may be registered in the dummy host characteristic information storage unit 17A. For example, the dummy host characteristic information storage unit 17A stores, as characteristic information of a dummy host, characteristic information corresponding to a computer name (or a NetBIOS name), an IP address, a MAC address, an OS information, a domain name, a group name, a network management name, and the like of a communication device. Thus, a communication device may appear existent even when the communication device is inactive. As a matter of course, a dummy host completely irrelevant to the communication device may be registered in the dummy host characteristic information storage unit 17A.

The dummy host start-up management unit 18 manages whether to start or not to start a dummy host individually for each dummy host, by referring to the dummy host characteristic information storage unit 17A. That is to say, the dummy host start-up management unit 18 manages whether or not to start a dummy host on the basis of characteristic information of the dummy host stored in the dummy host characteristic information storage unit 17A. The dummy host start-up management unit 18 determines whether to start or stop each dummy host the information of which is included in the dummy host characteristic information storage unit 17A.

For example, the dummy host start-up management unit 18 manages start-up of a dummy host, triggered by an external request. Specifically, when receiving an ON-request (i.e. a start-up request) with respect to a dummy host, the dummy host start-up management unit 18 starts the dummy host. When receiving an OFF-request (i.e. a stop request) with respect to a dummy host, the dummy host start-up management unit 18 stops the running of the dummy host. Then, the dummy host start-up management unit 18 outputs start-up information indicating whether or not each dummy host is started to the dummy host management unit 16. The dummy host start-up management unit 18 independently manages start-up of a plurality of dummy hosts the information of which is included in the dummy host characteristic information storage unit 17A. The dummy host start-up management unit 18 is able to dynamically change an active dummy host.

The dummy resource management unit 19 manages a mimicking dummy resource on the basis of operation information from the dummy resource operation management unit 20. That is to say, the dummy resource management unit 19 determines whether or not to make a dummy response with respect to a dummy resource to which a request is made. For example, when a request is made with respect to a dummy resource in operation, the dummy resource management unit 19 determines to make a response. On the other hand, regarding an inactive dummy resource, the dummy resource management unit 19 determines not to make a dummy response.

Furthermore, the dummy resource management unit 19 determines whether or not to make a response related to a resource list request, by referring to the characteristic information storage unit 17. For example, the dummy resource management unit 19 determines a dummy resource regarding which a response is made, on a basis of target network resource included in the request message. That is to say, the dummy resource management unit 19 determines to make a response corresponding to a dummy resource including a resource matching a resource included in the request message. When receiving a resource list request, the dummy resource management unit 19 determines to make a response, on the basis of list information of information about every dummy directory and every dummy file that are included in a relevant network resource.

Furthermore, when receiving a resource list request, the dummy resource management unit 19 determines to make a dummy response regarding a dummy resource being a target of the resource list request. The dummy resource management unit 19 refers to a target resource of the request message and determines whether or not a dummy resource is a target of the list request. The dummy resource management unit 19 determines whether or not to make a response related to the dummy resource, on the basis of a comparison result between the request target and characteristic information, and of a determination result by the request determination unit 15. The dummy resource management unit 19 determines necessity or unnecessity for making a response individually for each dummy resource in operation.

When a dummy resource in operation receives a list request, the dummy resource management unit 19 determines to cause a dummy response to be made as though the dummy resource were existent. On the other hand, when a resource receiving a list request is not a dummy resource in operation, a list request is not included in a request message, or a resource receiving a list request is not a dummy resource being a target of the list request, the dummy resource management unit 19 determines not to make a dummy response. Regarding an inactive dummy resource, the dummy resource management unit 19 stops the dummy resource from responding. The dummy resource management unit 19 determines that a response needs to be made with respect to every dummy resource in operation.

An external request to the dummy resource operation management unit 20 may be provided by a setting file, an application programming interface (API), an interface (IF), and the like. For example, the setting file is preset schedule data. For example, an operation start time and a stop time are set to such a setting file for each dummy resource. The security device 101 may store the setting file. Additionally, the dummy resource operation management unit 20 may manage operation of a dummy resource by complying with a request from a communication device existing on the network system 200. For example, the dummy resource operation management unit 20 may manage operation of a dummy resource in such a way that, in synchronization with operation-ON and OFF timings of a shared network resource in a communication device, the dummy resource is operated with an operation-OFF state, and the dummy resource is stopped with an operation-ON state.

An example of management by the dummy resource operation management unit 20 will be described below. It is assumed here in the characteristic information storage unit 17 that an address and network resource information that are same as those of a shared network resource on a communication device are registered as an address and network resource information of a dummy resource. For example, information by which a dummy resource related to a shared network resource on a communication device can be constructed is stored in the dummy resource operation management unit 20, in advance or by request. Specifically, a copy of information about the shared network resource on the communication device is set as characteristic information of the dummy resource. In this case, when the shared network resource on the communication device is in operation, the dummy resource operation management unit 20 stops operation of the dummy resource. On the other hand, when the shared network on the communication device is in an operation-OFF state, the dummy resource operation management unit 20 performs an instruction of operation of the dummy resource. On the other hand, at a timing of operation of the shared network on the communication device, the dummy resource operation management unit 20 performs an instruction to stop operation of the dummy resource.

Thus, triggered by an operation-ON state of the shared network resource on the communication device, the dummy resource operation management unit 20 operates the dummy resource. Triggered by an operation-OFF state of the shared network resource on the communication device, the dummy resource operation management unit 20 stops the dummy resource. Even in a situation that the communication device is detached from the network, the dummy resource exists on the network system 200. Consequently, a deception more likely to deceive an attacker can be set. It looks as though a dummy shared network resource existed from the viewpoint of the infected device 300. Thus, the dummy resource operation management unit 20 may manage operation of the dummy resource on the basis of whether or not the communication device is in operation.

The dummy resource characteristic information storage unit 17B stores characteristic information of a plurality of virtual dummy shared network resources. The characteristic information is information required for a network resource to be mimicked and is set individually for each dummy shared network resource. For example, the dummy resource operation management unit 20 manages operation of a dummy shared network resource on the basis of characteristic information. The dummy resource management unit 19 manages a dummy resource on the basis of characteristic information. The dummy resource management unit 19 and the dummy resource operation management unit 20 will be described later.

The characteristic information includes information about a directory and a file that are virtually mimicked. The characteristic information includes, for example, a directory name, a file name, and directory/file types, a date and time of last access, a date and time of last writing, and a date and time of modification. The characteristic information includes information about a file system virtually mimicked. The characteristic information includes, for example, a name (e.g. NT File System [NTFS]), a date and time of generation, a volume serial number, and a label name of a file system. As a matter of course, the aforementioned information is an exemplification. Accordingly, the characteristic information may include information other than that described above, and part of the aforementioned information may not be included. The dummy resource characteristic information storage unit 17B stores, for example, characteristic information of a plurality of dummy resources as a table. The dummy resource characteristic information storage unit 17B stores characteristic information equivalent to shared network resource management information of a communication device, as characteristic information of a dummy resource.

Furthermore, a dummy resource including characteristic information identical to management information included in a shared network resource on a communication device may be registered in the dummy resource characteristic information storage unit 17B. The management information of a shared network resource on a communication device includes, for example, a name of a directory or a file, a directory tree structure, and a date and time of update, in addition to a computer name (or a NetBIOS name), an IP address, a MAC address, OS information, a domain name, and a network management name of the communication device. A dummy resource including characteristic information corresponding to the above is registered in the dummy resource characteristic information storage unit 17B. Thus, even when operation of the shared network resource on the communication device is inactive, it may look as though the shared network resource existed. As a matter of course, a dummy resource completely irrelevant to the shared network resource on the communication device may be registered in the dummy resource characteristic information storage unit 17B.

The dummy resource operation management unit 20 manages whether a dummy resource should be operated or not to be operated for each dummy resource, by referring to the dummy resource characteristic information storage unit 17B. That is to say, the dummy resource operation management unit 20 manages whether or not to cause a dummy resource to operate, on the basis of characteristic information of the dummy resource. The dummy resource operation management unit 20 determines whether to operate or not to operate each dummy resource characteristic information of which is included in the dummy resource characteristic information storage unit 17B.

For example, the dummy resource operation management unit 20 manages operation of a dummy resource, triggered by an external request. Specifically, when receiving an ON-request (i.e. an operation request) with respect to a dummy resource, the dummy resource operation management unit 20 causes the dummy resource to operate. When receiving an OFF-request (i.e. a stop request) with respect to a dummy resource, the dummy resource operation management unit 20 stops operation of the dummy resource. Then, the dummy resource operation management unit 20 outputs operation information indicating whether or not each dummy resource is in operation to the dummy resource management unit 19. The dummy resource operation management unit 20 independently manages operation of a plurality of dummy resources characteristic information of which is included in the dummy resource characteristic information storage unit 17B. The dummy resource operation management unit 20 is able to dynamically change a dummy resource in operation.

The dummy response template storage unit 22 stores a template of a dummy response with respect to a search request. For example, the dummy response template storage unit 22 retains a message format by hard-coding. The dummy response template storage unit 22 stores a message format of a dummy response sentence. The dummy response template storage unit 22 stores a template for each request or each protocol. The dummy response template storage unit 22 stores a message response sentence associated with a requested service as a template. The dummy response template storage unit 22 stores a plurality of templates.

Furthermore, the dummy response template storage unit 22 stores a template of a dummy response message related to a resource list request. For example, the dummy response template storage unit 22 retains a message format by hard-coding. The dummy response template storage unit 22 stores a message format of a response sentence. The dummy response template storage unit 22 stores a template for each resource list request or each protocol. The dummy response template storage unit 22 stores a message response sentence related to a list request as a template. The dummy response template storage unit 22 stores a plurality of templates.

The dummy response generation unit 21 generates a dummy response in response to a request from the dummy host management unit 16 and a request from the dummy resource management unit 19. When the dummy host management unit 16 determines to respond, the dummy response generation unit 21 generates a dummy response in response to a request to a dummy host. At that time, the dummy response generation unit 21 generates a dummy response by using a template stored in the dummy response template storage unit 22. Thus, the dummy response generation unit 21 is able to generate a suitable dummy response message in response to the request.

The dummy response generation unit 21 acquires, from the characteristic information storage unit 17, characteristic information of a dummy host that is to respond and characteristic information of a dummy resource. Then, the dummy response generation unit 21 generates a dummy response message by combining the acquired characteristic information with a response message format. Specifically, the dummy response generation unit 21 generates a dummy response message including an address, OS information, and the like that are included in the characteristic information, information about a directory and a file that are virtually mimicked, and information about a virtually mimicked file system. The information about a directory and a file includes, for example, a directory name, a file name, a directory type, a file type, a date and time of last access, a date and time of last writing, and a date and time of modification. The information about a file system includes, for example, NTFS as a file system name, a date and time of generation, a volume serial number, and a label name. Thus, a more deceitful deception can be set.

The dummy response template storage unit 22 stores a template related to a service provided by a dummy host and a dummy resource. When a plurality of dummy hosts and dummy resources are able to use a same service, the dummy response generation unit 21 further generates a dummy response message to a resource list request by using a common template. The dummy response template storage unit 22 may further store a response template individually for each message included in a white list in the request determination unit 15. As types of templates increase, types of requests that can be handled increase. A message included in the white list does not necessarily need to be associated one-to-one with a template stored in the dummy response template storage unit 22. For example, a message set in the white list may be associated with part of some template. The dummy response generation unit 21 may generate a dummy response message with respect to a message set in the white list by using part of a template associated with the message.

The dummy response transmission queue 24 queues a dummy response message generated by the dummy response generation unit 21. The dummy response transmission unit 25 transmits a dummy response message queued in the dummy response transmission queue 24 to the infected device 300 as a dummy response. The dummy response transmission unit 25 transmits a dummy response by a packet a destination address of which is an address of the infected device 300.

Furthermore, a dummy response message stored in the dummy response transmission queue 24 is transmitted to the network system 200 through the dummy response transmission unit 25 in accordance with an instruction of the dummy response transmission control unit 23. That is to say, the dummy response transmission unit 25 controls a transmission timing at which the dummy response transmission unit 25 transmits a dummy response. At a timing based on the instruction of the dummy response transmission control unit 23, the dummy response transmission unit 25 transmits a dummy response message to the infected device 300 through the network system 200.

Thus, the dummy response transmission control unit 23 controls a transmission timing of a dummy response stored in the dummy response transmission queue 24. For example, the dummy response transmission control unit 23 performs control in such a way that the dummy response transmission unit 25 transmits dummy response messages in a queuing order. Alternatively, the dummy response transmission control unit 23 may perform control in such a way that the dummy response transmission unit 25 randomly transmits dummy response messages. The dummy response transmission control unit 23 may perform control in such a way that the dummy response transmission unit 25 transmits dummy response messages according to a predetermined pattern. By control by the dummy response transmission control unit 23, a transmission order of dummy responses can be changed. The dummy response transmission control unit 23 may perform control in such a way that the dummy response transmission unit 25 transmits a dummy response message after waiting for a certain period of time, on the basis of a preset delay time. The dummy response transmission control unit 23 transmits a dummy response in the dummy response transmission queue 24 to the network system 200 in accordance with an instruction of the dummy response transmission control unit 23.

For example, when receiving a broadcast message about a search request, the dummy response generation unit 21 generates dummy response messages for active dummy hosts. Then, the dummy response transmission queue 24 queues, for example, the dummy response messages in an order of characteristic information of the dummy hosts stored in the characteristic information storage unit 17. For example, when pretending that four dummy hosts are operating, the dummy response transmission queue 24 queues dummy response messages in order of the four dummy hosts. Then, the dummy response transmission unit 25 transmits the dummy response messages in order of the queue. Alternatively, the dummy response transmission unit 25 may transmit the dummy response messages in a random order. When a response timing is set to the dummy response transmission control unit 23 for each dummy host, the dummy response transmission unit 25 may transmit the dummy response messages according to the response timings. The dummy response transmission unit 25 may transmit the dummy response messages in order and at timings based on a preset schedule.

The dummy response transmission control unit 23 may set a timer value on the basis of a time elapsed from a start of transmission of dummy response messages. The timer value may be a value indicating a time elapsed from a start of transmission of dummy response messages. The dummy response transmission control unit 23 may count a transmission quantity of dummy response messages, and control a transmission quantity of dummy response messages, in addition to transmission timings of the dummy response messages, on the basis of a counted value of the transmission quantity (i.e. a counted value). In that case, the dummy response transmission control unit 23 sets a timer value on the basis of the counted value, in such a way that the timer value becomes larger as the counted value becomes larger. The dummy response transmission control unit 23 may set the timer value to the counted value.

When making a response to an enumeration request for a directory and a file to a dummy resource, by making the response to the effect that there is additional information, the dummy response generation unit 21 is able to cause the infected device 300 to uninterruptedly continue the file enumeration request. The dummy response transmission control unit 23 determines, on the basis of the timer value, whether the dummy response generation unit 21 continues or stops responding. For example, when the timer value is larger than a predetermined timer threshold value, the dummy response transmission control unit 23 determines to stop responding. For example, when the timer value is not larger than the predetermined timer threshold value, the dummy response transmission control unit 23 determines to continue responding. When determining to continue responding, the dummy response transmission control unit 23 causes the infected device 300 to continue the file enumeration request, by causing the dummy response generation unit 21 to continue responding. When determining to stop responding, the dummy response transmission control unit 23 causes the infected device 300 to end the file enumeration by causing the dummy response generation unit 21 to stop responding. When causing the infected device 300 to unlimitedly continue the file enumeration request, the dummy response transmission control unit 23 causes the dummy response generation unit 21 to continually make a response to the effect that there is additional information. When making a response that there is additional information, for example, in a response to a first file enumeration request, the dummy response generation unit 21 sets an End Of File flag (also referred to as a "request end flag" in the description of the present example embodiment) included in the response to, for example, an invalid value (e.g. 0) indicating that the flag is invalid. Then, the dummy response generation unit 21 continues to set the End Of File flag to an invalid value in subsequent responses. When a value of the End Of File flag in a response is an invalid value, the infected device 300 continues to make the file enumeration request. When causing the file enumeration request to be stopped, the dummy response generation unit 21 sets the End Of File flag to, for example, a valid value (e.g. 1) indicating that the flag is valid. When a value of the End Of File flag is a valid value, the infected device 300 stops making the file enumeration request.

Consequently, the dummy response transmission control unit 23 is able to continually cause a large amount of information to be transmitted to the infected device 300, by setting transmission timings in such a way that transmission intervals of dummy response messages are shortened, and causing the infected device 300 to continue making the file enumeration request. It is also possible to continually causing processing to be performed uninterruptedly, even though an information amount per unit time may be small, by maximizing intervals of transmission timings of dummy response messages within an interval not causing timeouts, and causing the file enumeration request to continue.

Next, when receiving an SMB negotiate protocol request message, if that is determined as a request to a dummy resource in operation, the dummy response generation unit 21 generates a dummy response message based on the dummy resource in operation. Then, the dummy response generation unit 21 queues a dummy response message based on the dummy resource stored in the characteristic information storage unit 17. Then, the dummy response transmission unit 25 transmits the dummy response message in the queue.

The dummy response transmission control unit 23 controls a timing of a dummy response made by the dummy response transmission unit 25 for each dummy host individually. The response timing may be set on the basis of a network distance stored for each dummy host in the characteristic information storage unit 17. In that case, the dummy response transmission control unit 23 delays a response timing with respect to a dummy host with a farther network distance. The dummy response transmission control unit 23 advances a response timing with respect to a dummy host with a nearer network distance. The dummy response transmission control unit 23 may refer to the characteristic information storage unit 17 and set a delay time based on a network distance of a dummy host. Thus, by the dummy response transmission control unit 23 controlling a transmission timing of a dummy response message, it looks as though each dummy host existed to the infected device 300. In other words, a deception more likely to deceive an attacker can be set.

The dummy response transmission unit 25 transmits a dummy response message queued in the dummy response transmission queue 24 to the network system 200.

Figure 3:
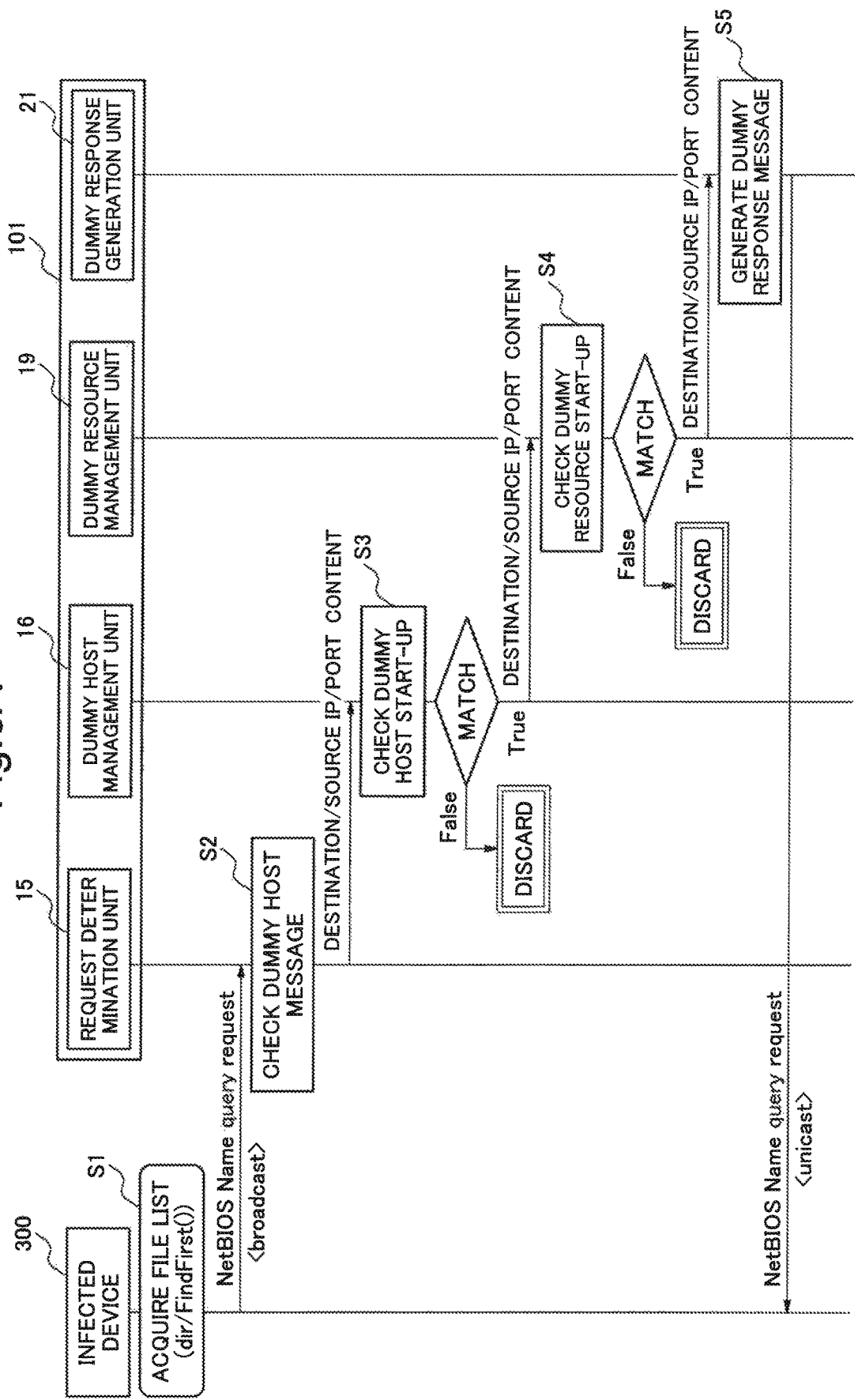
FIG. 3A is a diagram illustrating a communication sequence when a dummy resource list is acquired.
FIG. 3B is a diagram illustrating the communication sequence when a dummy resource list is acquired.

A dummy resource list acquisition sequence based on the aforementioned configuration and operation will be described. FIGS. 3a and 3b are sequence diagrams illustrating a communication sequence of making a list request to a dummy resource according to the present example embodiment.

In the diagrams, the infected device 300 is, for example, infected with malware. Then, an attacker is in a state of being able to control the infected device 300. The attacker searches for a communication device connected to the network system 200 by using a program included in the infected device 300. The attacker discovers a communication device by using, for example, a Netview command and a findsmb command. More specifically, the attacker discovers a shared network resource by using a Netview command. The attacker discovers, for example, that a shared name (doc) of a virtual network resource mimicked by the security device 101 is shared by a dummy host (¥¥host-101). A path to the dummy resource in this case is (¥¥host-101¥doc).

Next, in order to obtain a list of directories and files on the network resource, the attacker causes the infected device 300 to execute a command requesting a file list by manipulating the infected device 300, without being aware that the resource is a dummy resource. At this time, a dir command included in a Windows OS may be used. FindFirst( ) open to the public as a Windows API may be called. Then, the infected device 300 transmits a request (e.g. a NetBIOS message) for a file list (Step S1).

By checking a type of NetBIOS message transmitted from the infected device 300, the request determination unit 15 in the security device 101 checks whether or not the message is a message targeting a dummy host (Step S2). When the NetBIOS message transmitted from the infected device 300 is a message targeting a dummy host, the dummy host management unit 16 checks whether or not the dummy host targeted by the message is a dummy host in operation (Step S3). When the dummy host targeted by the message is not a dummy host in operation, the dummy host management unit 16 discards the message. When the dummy host targeted by the message is a dummy host in operation, the dummy host management unit 16 proceeds to next processing.

The dummy resource management unit 19 checks whether or not a resource requested by the message is a dummy resource in operation (Step S4). When the resource requested by the message is not in operation, the dummy resource management unit 19 discards the message. When the resource requested by the message is a dummy resource in operation, the dummy response generation unit 21 generates a dummy response message responding to the message (Step S5). The dummy response generation unit 21 transmits the generated dummy response message to the infected device 300 through the dummy response transmission unit 25. Consequently, by receiving a response to the NetBIOS message, the infected device 300 confirms that the resource certainly exists.

Next, the infected device 300 starts an SMB session (Step S6). In the security device 101, the dummy resource management unit 19 acquires information required for making a dummy resource appear as an actual resource, from the dummy resource characteristic information storage unit 17B, by referring to the dummy resource characteristic information storage unit 17B (Step S8). The dummy response generation unit 21 generates a dummy response message by using the read aforementioned required information. The dummy response generation unit 21 responds with the generated dummy response message (Step S8).

Although not explicitly illustrated, the security device 101 performs similar processing in subsequent SMB message processing. A part characteristic to an operation by the dummy response generation unit 21 will be mainly described below.

Figure 4:
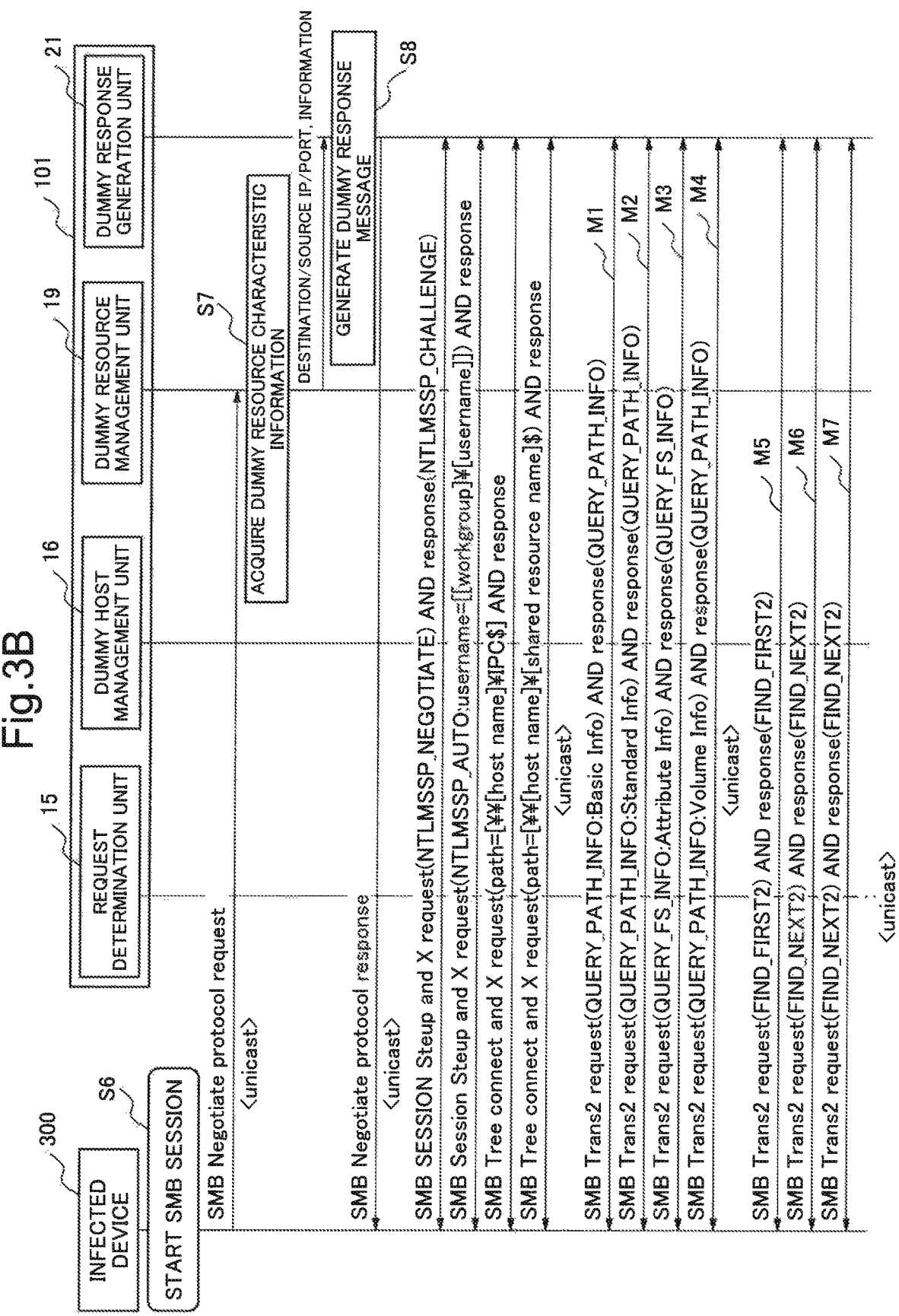
FIG. 4A is a diagram representing a message generated by a dummy response generation unit 21.
FIG. 4B is a diagram representing a message generated by the dummy response generation unit 21.
FIG. 4C is a diagram representing a message generated by the dummy response generation unit 21.
FIG. 4D is a diagram representing a message generated by the dummy response generation unit 21.
FIG. 4E is a diagram representing a message generated by the dummy response generation unit 21.

In an SMB Trans2 Response message (M1), the dummy response generation unit 21 sets a time stamp and a file attribute, as indicated in FIG. 4A. The dummy response generation unit 21 sets a flag indicating a directory in "File Attributes". The dummy response generation unit 21 sets the time stamp to a value (i.e. a non-future date and time) not indicating the future. For example, a newly updated shared folder is attractive to an attacker. By setting the time stamp to a date and time as recent as possible, a dummy resource may appear to be attractive information to the attacker. As a method of setting a time stamp, the dummy response generation unit 21 may use any setting method such as a setting method based on a preset date and time, or a random selection method.

In an SMB Trans2 Response message (M2), the dummy response generation unit 21 sets an End of File flag to a value 0 indicating "not an end of the file," as indicated in FIG. 4B. By setting the flag to 0, the infected device 300 receiving the message M2 determines that more information about the directory and the file exists and continues requesting.

In an SMB Trans2 Response message (M3), the dummy response generation unit 21 sets a file system attribute (FS Attribute) to, for example, a file system attribute value acquired from communication by an actual Windows host, as indicated in FIG. 4C. Further, the dummy response generation unit 21 sets an FS Name to NTFS. The value set to the FS Attribute is not limited to the value described herein, and a value normally used and assumed may be used.

In an SMB Trans2 Response message (M4), the dummy response generation unit 21 sets a value of a "Label," as indicated in FIG. 4D. The "Label" corresponds to a shared name in generation of a shared folder. By setting the "Label" value to a folder name attractive to an attacker, the attacker may be more likely to be lured.

In an SMB Trans2 Response message (M5), the dummy response generation unit 21 sets values of a "Search Count" and an "End Of Search" in a FIND FIRST2 parameter, as indicated in FIG. 4E. The dummy response generation unit 21 sets the number of the "Search Count" to a number identical to a total number of directories and files that are stored in a subsequent data area. The directories and the files that are stored in the data area correspond to dummy directories and dummy files generated by the security device 101. Information stored in the aforementioned data area is information acquired from the dummy resource characteristic information storage unit 17B. The dummy response generation unit 21 sets the End Of Search flag to 0. As long as the flag is set to 0, the infected device 300 being an inquiry source determines that at least either of a dummy directory or a dummy file exists on the dummy resource being accessed. Such an infected device 300 is likely to continue acquiring information about the dummy resource. In other words, unless the flag is set to 1, the infected device 300 being an inquiry source may continue making inquiries. In contrast, when discontinuing inquiries, for example, the dummy response generation unit 21 sets the flag to 1. By the flag being set to 1, the infected device 300 may end the list acquisition processing of directories and files.

When receiving a message (M5) with the End Of Search flag set to 0, the infected device 300 further requests a list of dummy directories or dummy files that are not acquired. Specifically, the infected device 300 transmits an SMB Trans2 Request(FIND_NEXT2) message (M6) in order to further request a list of dummy directories or dummy files. Unless the End Of Search flag is set to 1, the security device 101 and the infected device 300 continue the message exchange (M7 and thereafter).

The present example embodiment described above provides a first effect of improving security.

The reason is that, the dummy response transmission control unit 23 controls, on the basis of a timer value, a request end flag indicating presence or absence of a dummy response not transmitted by dummy responses generated by the dummy response generation unit 21 in response to requests for dummy resources from the infected device 300. When the infected device 300 attempts an intrusion on the basis of the request end flag, the infected device 300 repeats the request while the request end flag indicates that there is a dummy response not being transmitted. Consequently, the intrusion operation by the infected device 300 is obstructed. Accordingly, security can be improved.

In general, a honeytoken is information in some form, but is non-secret false information not used for a purpose for which the information in the form is primarily used. Accordingly, even when a honeytoken deployed in a network in an organization is acquired by a cyberattacker intruding into the network, there should primarily be no influence on the organization. However, when it is difficult to determine whether the information leaked out by the attacker is true information or false information, there is a fear that brand power of the organization degrades due to a reputation that true information is leaked out spreading to the world. However, according to the present example embodiment, substance of electronic information configured as a honeytoken by false information does not exist, and only meta-information of the electronic information exists as a honeytoken. Even when an attacker acquires the honeytoken, only the meta-information falls into the hands of the attacker. Accordingly, a virtual honeytoken with higher security can be used.

More specifically, information falling into the hands of the attacker with respect to a virtually mimicked directory and a virtually mimicked file, according to the present example embodiment, is limited only to meta-information such as a date and time of generation, a type, a name, and a size of the directory and the file. Electronic information including a content of information about the directory and the file does not fall into the hands of the attacker. The reason is that substance of the electronic information does not exist in the first place.

Furthermore, when the aforementioned meta-information is configured by using information attractive to the attacker, the attacker obtaining a list of dummy directories and dummy files that appear to exist right in front may not simplistically give up and may attempt to somehow acquire substance of the electronic information. Thus, repeated attempts by the attacker at a directory and a file that primarily do not exist may cause the attacker to waste time. Thus, a deception more likely to deceive the attacker can be set. Moreover, an attack cost can be increased. Accordingly, security can be improved.

Furthermore, when the dummy resource characteristic information storage unit 17B stores characteristic information of an enormous amount of dummy resources, and the dummy resource operation management unit 20 is set to operate the enormous amount of dummy resources, the enormous amount of dummy resources can be continuously sent back to the attacker. For example, when ten million directories and files are set to look as though the directories and files existed as dummy resources, the attacker continues to uninterruptedly receive the ten million directories and files unless the attacker stops receiving the information halfway. For example, it is possible to continue sending information amounting the ten million directories and files for a long time (e.g. one week) uninterruptedly.

Consequently, when the infected device 300 stores received information in an in-memory, a memory usage amount continues to increase. Consequently, when the memory usage amount of the infected device 300 exceeds a permissible memory usage amount, lack of memory influences operation of the infected device 300. For example, improper program termination, unstable program operation, insufficient exhibition of program performance, and increase in CPU utilization may be considered as the influence on operation of the infected device 300. For example, when the infected device 300 uses a remote administration tool (RAT), information received by the infected device 300 is transmitted by the RAT to a device which is connected outside the network system 200 and on which a program communicating with the RAT operates. In that case, the infected device 300 continues to transmit received information to the device on which the program communicating with the RAT operates. At this time, occurrence of an adverse effect similar to the description above is anticipated in the device on which the program communicating with the RAT operates.

When the infected device 300 writes received information to a file instead of an in-memory, by continuing to receive a large amount of information uninterruptedly, a file to which the received information is written grows huge. In this case, for example, a huge-sized file of several gigabytes is generated and a hard disk area for file retention is squeezed in the infected device 300, independent of the attacker's intention. In terms of the attacker, when an attack is promptly discovered by a defender, a cost of the attack previously spent by the attacker is wasted. The attacker intends to construct a long-term attack infrastructure with which an attack is not discovered by a defender. Accordingly, the attack is controlled in such a way to stealthily operate without making a conspicuous move as much as possible such as eluding a detection mechanism as much as possible and detecting operation on an analysis system. The present example embodiment is expected to provide an effect as a mechanism to induce an attack controlled not to be conspicuous to make a conspicuous move.

The security device 101 generates a plurality of dummy directories, a plurality of dummy files, and a dummy host on which the directories and the files appear to be deployed, independent of whether or not a communication device being a source of a message is a malicious attacker. Accordingly, there is no need to detect whether an attacker bears malice. Accordingly, security against a skillful attack concealing malice can be improved.

Regarding virtually mimicking shared network resources, names of a dummy directory and a dummy file may be set on the basis of a name and a naming convention that are frequently used in an organization in which the security device 101 is used. Consequently, the directories and the files appear to be more attractive information to an attacker, and therefore higher security can be provided.

In the description above, the dummy host characteristic information storage unit 17A and the dummy resource characteristic information storage unit 17B, according to the present example embodiment, store required information in advance. However, the security device 101 may include an update unit (unillustrated) updating setting values stored in the dummy host characteristic information storage unit 17A and the dummy resource characteristic information storage unit 17B, in response to an external input (unillustrated). Thus, a flexible system operation can be provided.

In the description above, a dummy network resource generated by the security device 101 according to the present example embodiment appears as an externally existing network resource from the viewpoint of the infected device 300. However, a symbolic link to such a dummy network resource may be generated in the infected device 300. Generation of the symbolic link to the dummy network resource enables simulative deployment of the dummy network resource in a file system of the infected device 300.

As described above, in a situation that an attacker is searching for a directory and a file on the infected device 300, an effect of a mechanism according to the present example embodiment can be obtained.

As described above, in the security system 100 according to the present example embodiment, the dummy resource characteristic information storage unit 17B includes characteristic information of a plurality of dummy resources. The dummy resource operation management unit 20 manages operating states of a plurality of dummy hosts on the basis of the characteristic information. The dummy resource management unit 19 determines whether or not the plurality of dummy resources operated by the dummy resource operation management unit 20 respond, on the basis of a request included in a received message. Then, the dummy response generation unit 21 generates a dummy response for each dummy resource, and the dummy response transmission unit 25 transmits the response. Thus, it may look as though the dummy network resources were existent. In other words, an illusion of the virtual dummy shared network resource 110 including the plurality of dummy resources can be presented to the infected device 300.

Second Example Embodiment

Next, referring to a drawing, a second example of the present invention will be described in detail.

Figure 5:
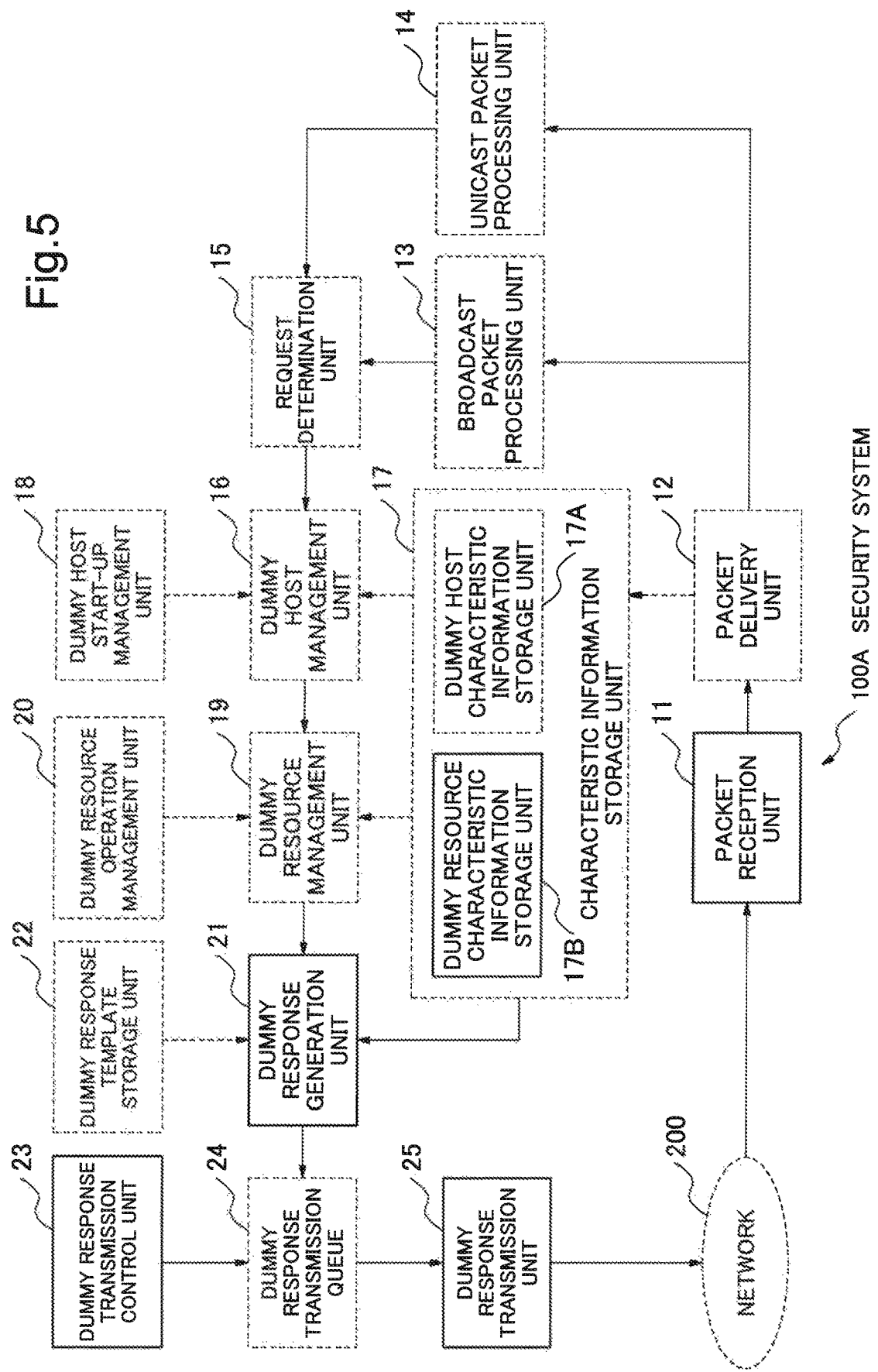
FIG. 5 is a block diagram illustrating a configuration example of a security system 100A according to a second example embodiment of the present invention.

FIG. 5 is a block diagram illustrating a configuration example of a security system 100A according to the present example embodiment.

Referring to FIG. 5, the security system 100A according to the present example embodiment includes a packet reception unit 11, a dummy resource characteristic information storage unit 17B, a dummy response generation unit 21, a dummy response transmission control unit 23, and a dummy response transmission unit 25. The packet reception unit 11 receives a request from an intruding device 300 attempting an intrusion. The dummy resource characteristic information storage unit 17B stores characteristic information of a plurality of virtual dummy resources. The dummy response generation unit 21 generates a dummy response in response to the request to the dummy resource, based on the characteristic information. The dummy response transmission control unit 23 controls a request end flag indicating presence or absence of the dummy resource not being transmitted, based on a timer value. The dummy response transmission unit 25 transmits the dummy response to the intruding device transmitting the request, based on the request end flag. The security system 100A can be achieved by a device including the respective units described above.

The present example embodiment described above provides the first effect according to the first example embodiment. The reason is the same as the reason the first effect according to the first example embodiment is provided.

The security system 100 according to the example embodiments described above may be achieved in part or in whole by a computer program. The aforementioned program may be stored by using various types of non-transitory computer-readable media and supplied to a computer. The non-transitory computer-readable media include various types of tangible storage media. Examples of the non-transitory computer-readable media include a magnetic storage (e.g. a flexible disk, a magnetic tape, and a hard disk drive), a magneto-optical storage medium (e.g. a magneto-optical disk), a CD-read only memory (ROM), a CD-R, a CD-R/W, and a semiconductor memory (e.g. a mask ROM, a programmable ROM (PROM), an erasable PROM (EPROM), a flash ROM, and a random access memory (RAM)). The program may be supplied to the computer by various types of transitory computer-readable media. Examples of the transitory computer-readable media include an electric signal, an optical signal, and an electromagnetic wave. The transitory computer-readable medium is able to supply the program to the computer through a wired communication channel such as an electric wire and an optical fiber, or a wireless communication channel.

Specifically, each of the security system 100 and the security system 100A may be achieved by a computer and a program controlling the computer, dedicated hardware, or a combination of a computer and a program controlling the computer, with dedicated hardware.

Figure 6:
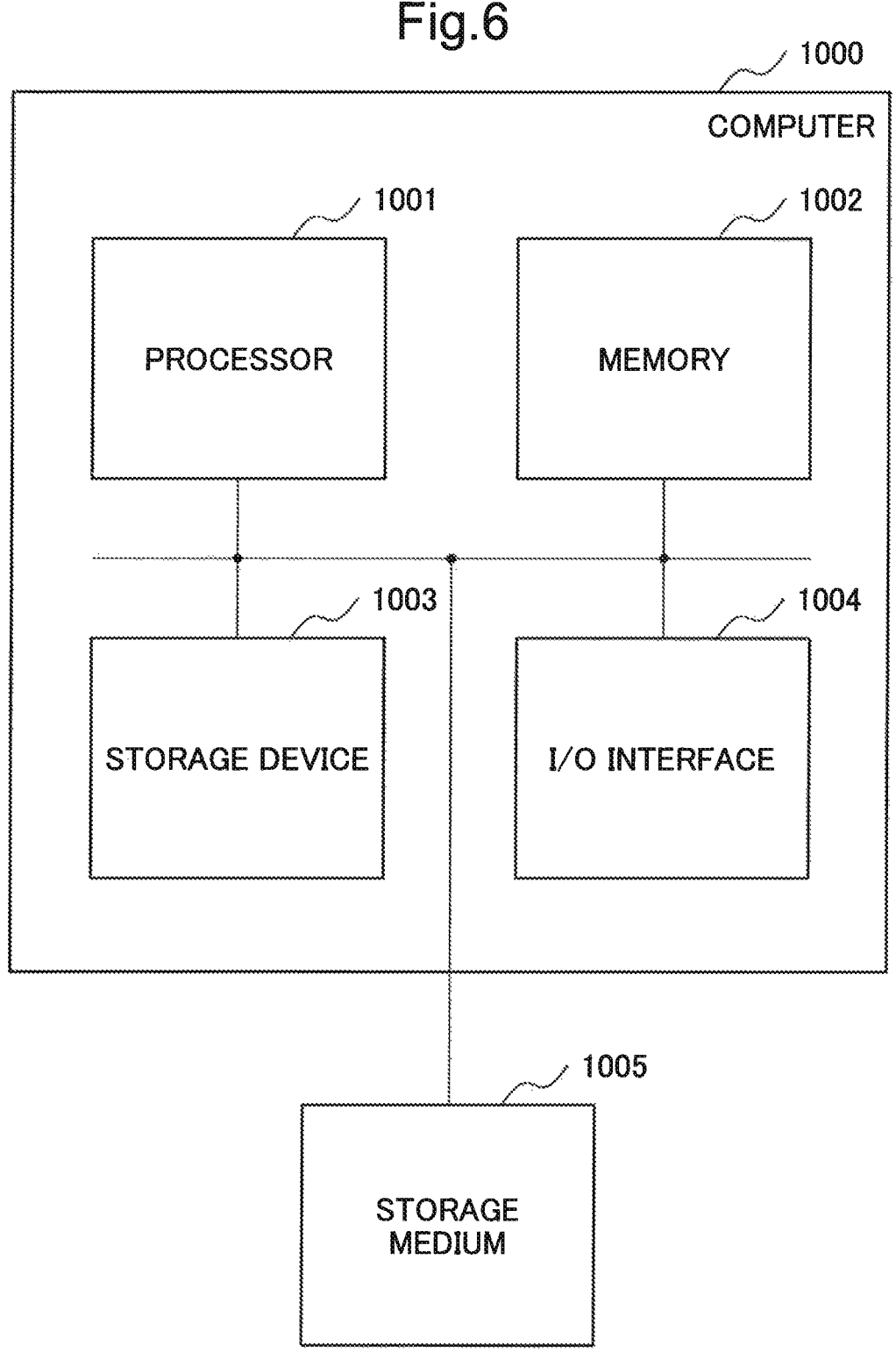
FIG. 6 is a diagram illustrating a hardware configuration example of a computer 1000 capable of providing a security device 101 according to the first example embodiment of the present invention and the security system 100A according to the second example embodiment.

FIG. 6 is a diagram illustrating a hardware configuration example of a computer 1000 capable of achieving the security device 101 according to the first example of the present invention and the security system 100A according to the second example embodiment. Referring to FIG. 6, the computer 1000 includes a processor 1001, a memory 1002, a storage device 1003, and an input/output (I/O) interface 1004. The computer 1000 is able to access a storage medium 1005. The memory 1002 and the storage device 1003 are, for example, storage devices such as a random access memory (RAM) and a hard disk. The storage medium 1005 is, for example, a storage device such as a RAM and a hard disk, a read only memory (ROM), and a portable storage medium.

The storage device 1003 may be the storage medium 1005. The processor 1001 is able to read and write data and a program from and to the memory 1002 and the storage device 1003. For example, the processor 1001 is able to access a network system 200 through the I/O interface 1004. The processor 1001 is able to access the storage medium 1005. The storage medium 1005 stores a program causing the computer 1000 to operate as the security system 100 or the security system 100A.

The processor 1001 loads a program stored in the storage medium 1005 into the memory 1002, the program causing the computer 1000 to operate as the security system 100 or the security system 100A. Then, by the processor 1001 executing the program loaded in the memory 1002, the computer 1000 operates as the security system 100 or the security system 100A.

Each unit included in a first group described below can be provided by, for example, a dedicated program capable of providing a function of each unit, the program being read into the memory 1002 from the storage medium 1005 for storing a program, and the processor 1001 executing the program. The first group includes the packet reception unit 11, the packet delivery unit 12, the broadcast packet processing unit 13, the unicast packet processing unit 14, and the request determination unit 15. The first group further includes the dummy host management unit 16, the dummy host start-up management unit 18, the dummy resource management unit 19, the dummy resource operation management unit 20, the dummy response generation unit 21, the dummy response transmission control unit 23, and the dummy response transmission unit 25. Further, each unit included in a second group described below can be provided by the memory 1002 included in the computer 1000, and the storage device 1003 such as a hard disk device. The second group includes the dummy host characteristic information storage unit 17A, the dummy resource characteristic information storage unit 17B, the dummy response template storage unit 22, and the dummy response transmission queue 24. The second group may include the characteristic information storage unit 17 including the dummy host characteristic information storage unit 17A and the dummy resource characteristic information storage unit 17B, the dummy response template storage unit 22, and the dummy response transmission queue 24. Alternatively, the units included in the first group and the units included in the second group may be provided in part or in whole by a dedicated circuit providing the functions of the units.

Further, the aforementioned example embodiments may also be described in part or in whole as the following Supplementary Notes but are not limited thereto.

(Supplementary Note 1)
A security system comprising:
packet reception means for receiving a request from an intruding device attempting an intrusion;
dummy resource characteristic information storage means for storing characteristic information of virtual dummy resources;
dummy response generation means for generating, based on the characteristic information, a dummy response in response to the request to the dummy resources;
dummy response transmission control means for controlling, based on a timer value, a request end flag indicating presence or absence of the dummy resources not transmitted by the dummy response; and
dummy response transmission means for transmitting the dummy response to the intruding device that transmits, based on the request end flag, the request.

(Supplementary Note 2)
The security system according to Supplementary Note 1, wherein
the dummy response transmission control means
determines the timer value, based on an amount of the dummy response transmitted by the dummy response transmission means,
when the timer value is not larger than a preset timer threshold value, sets the request end flag to a value not being the valid value, and,
when the timer value is larger than the timer threshold, sets the request end flag to the valid value.

(Supplementary Note 3)
The security system according to Supplementary Note 1, wherein
the dummy response transmission control means
determines the timer value, based on a time elapsed from a time when dummy response transmission means starts transmitting a dummy response,
when the timer value is not larger than a preset timer threshold value, sets the request end flag to a value not being the valid value, and,
when the timer value is larger than the timer threshold value, sets the request end flag to the valid value.

(Supplementary Note 4)
The security system according to Supplementary Note 2 or 3, wherein
the dummy response transmission means continues transmitting the dummy response when the timer value is not larger than the timer threshold value.

(Supplementary Note 5)
The security system according to any one of Supplementary Notes 1 to 4, wherein
the dummy response transmission control means sets the timer value, based on an amount of a dummy response transmitted per unit time, and controls a transmission timing by the dummy response transmission means, based on the timer value.

(Supplementary Note 6)
The security system according to any one of Supplementary Notes 1 to 5, wherein
the dummy response generation means generates the dummy response including a value of the request end flag, and
the dummy response transmission means transmits the dummy response by using a communication protocol that performs, based on the request end flag, continuation determination of processing.

(Supplementary Note 7)
The security system according to any one of Supplementary Notes 1 to 6, wherein
the communication protocol includes a NetBIOS Name Service (NBNS), and a Server Message Block (SMB).

(Supplementary Note 8)
A security method comprising:
receiving a request from an intruding device attempting an intrusion;
generating, based on characteristic information of virtual dummy resources, a dummy response in response to the request to the dummy resources;
controlling, based on a timer value, controlling a request end flag indicating presence or absence of the dummy resources not being transmitted; and
transmitting the dummy response to the intruding device that transmits, based on the request end flag, the request.

(Supplementary Note 9)

The security method according to Supplementary Note 8, further comprising:

determining the timer value, based on an amount of the dummy response being transmitted;

when the timer value is larger than a preset timer threshold value, setting the request end flag to a valid value; and, when the timer value is not larger than the timer threshold value, setting the request end flag to a value other than the valid value.

(Supplementary Note 10)

The security method according to Supplementary Note 8, further comprising:

determining the timer value, based on a time elapsed from a time when starting transmitting a dummy response;

when the timer value is not larger than a preset timer threshold value, setting the request end flag to a value not being the valid value; and, when the timer value is larger than the timer threshold value, setting the request end flag to the valid value.

(Supplementary Note 11)

The security method according to Supplementary Note 9 or 10, further comprising continuing transmitting the dummy response when the timer value is not larger than the timer threshold value.

(Supplementary Note 12)

The security method according to any one of Supplementary Notes 8 to 11, further comprising:

setting the timer value, based on an amount of a dummy response transmitted per unit time; and controlling a transmission timing, based on the timer value.

(Supplementary Note 13)

The security method according to any one of Supplementary Notes 8 to 12, further comprising:

generating the dummy response including a value of the request end flag; and transmitting the dummy response by using a communication protocol that performs, based on the request end flag, continuation determination of processing.

(Supplementary Note 14)

The security method according to any one of Supplementary Notes 8 to 13, wherein the communication protocol includes a NetBIOS Name Service (NBNS), and a Server Message Block (SMB).

(Supplementary Note 15)

A program causing a computer to perform:

packet reception processing of receiving a request from an intruding device attempting an intrusion;

dummy response generation processing of generating, based on characteristic information of virtual dummy resources, a dummy response in response to the request to the dummy resources;

dummy response transmission control processing of controlling, based on a timer value, a request end flag indicating presence or absence of the dummy resources not being transmitted; and dummy response transmission processing of transmitting the dummy response to the intruding device that transmits, based on the request end flag, the request.

(Supplementary Note 16)

The program according to Supplementary Note 15, wherein the dummy response transmission control processing determines the timer value, based on an amount of the dummy response transmitted by the dummy response transmission processing, when the timer value is not larger than a preset timer threshold value, sets the request end flag to a value not being the valid value, and, when the timer value is larger than the timer threshold, sets the request end flag to the valid value.

(Supplementary Note 17)

The program according to Supplementary Note 15, wherein the dummy response transmission control processing determines the timer value, based on a time elapsed from a time when dummy response transmission processing starts transmitting a dummy response, when the timer value is not larger than a preset timer threshold value, sets the request end flag to a value not being the valid value, and, when the timer value is larger than the timer threshold value, sets the request end flag to the valid value.

(Supplementary Note 18)

The program according to Supplementary Note 16 or 17, wherein the dummy response transmission processing continues transmitting the dummy response when the timer value is not larger than the timer threshold value.

(Supplementary Note 19)

The program according to any one of Supplementary Notes 15 to 18, wherein the dummy response transmission control processing sets the timer value, based on an amount of a dummy response transmitted per unit time, and controls a transmission timing by the dummy response transmission processing, based on the timer value.

(Supplementary Note 20)

The program according to any one of Supplementary Notes 15 to 19, wherein the dummy response generation processing generates the dummy response including a value of the request end flag, and the dummy response transmission processing transmits the dummy response by using a communication protocol that performs, based on the request end flag, continuation determination of processing.

(Supplementary Note 21)

The program according to any one of Supplementary Notes 15 to 20, wherein the communication protocol includes a NetBIOS Name Service (NBNS), and a Server Message Block (SMB).

While the present invention has been described above with reference to the example embodiments, the present invention is not limited to the description above. Various changes and modifications that can be understood by a person skilled in the art may be made to the configurations and details of the present invention, within the scope of the present invention.

This application claims priority based on Japanese Patent Application No. 2015-107115 filed on May 27, 2015, the disclosure of which is incorporated herein by reference thereto in its entirety.

REFERENCE SIGNS LIST

11 Packet reception unit
12 Packet delivery unit
13 Broadcast packet processing unit
14 Unicast packet processing unit
15 Request determination unit
16 Dummy host management unit
17 Characteristic information storage unit 17A Dummy host characteristic information storage unit
17B Dummy resource characteristic information storage unit
18 Dummy host start-up management unit
19 Dummy resource management unit
20 Dummy resource operation management unit
21 Dummy response generation unit
22 Dummy response template storage unit
23 Dummy response transmission control unit
24 Dummy response transmission queue
25 Dummy response transmission unit
100 Security system
100A Security system
101 Security device
110 Dummy shared network resource
111, 112 Dummy directory
113, 114 Dummy file
102 Communication device
120 Shared network resource
121 Real directory
122 Real file
200 Network system
300 Infected device
1000 Computer
1001 Processor
1002 Memory
1003 Storage device
1004 I/O interface
1005 Storage medium
S1 to S8 Processing in dummy resource list acquisition sequence
M1 to M7 Message generated by dummy response generation unit

What is claimed is:

1. A security system comprising:
a storage that stores characteristic information of virtual dummy resources;
a memory that stores a set of instructions; and
at least one first processor configured to execute the set of instructions to:
receive a request from an intruding device attempting an intrusion;
generate, based on the characteristic information, a dummy response in response to the request to the dummy resources;
determine a timer value;
control, based on the timer value, a request end flag indicating presence or absence of the dummy resources not transmitted by the dummy response; and
transmit the dummy response to the intruding device that transmits, based on the request end flag, the request,
wherein each of the dummy resources is virtually operated when each corresponding resource turns off, and each of the dummy resources is virtually stopped when each corresponding resource turns on, and
wherein the at least one first processor is further configured to:
when the timer value is not larger than a preset timer threshold value, set the request end flag to a value not being a valid value; and
when the timer value is larger than the preset timer threshold value, set the request end flag to the valid value.

2. The security system according to claim 1, wherein the timer value is determined based on an amount of the dummy response transmitted.

3. The security system according to claim 2, wherein the at least one first processor is further configured to continue transmitting the dummy response when the timer value is not larger than the timer threshold value.

4. The security system according to claim 1, wherein the timer value is determined based on a time elapsed from a time starting to transmit the dummy response.

5. The security system according to claim 1, wherein the at least one first processor is further configured to:
set the timer value, based on an amount of a dummy response transmitted per unit time; and control a transmission timing, based on the timer value.

6. The security system according to claim 1, wherein the at least one first processor is further configured to:
generate the dummy response including a value of the request end flag; and
transmit the dummy response by using a communication protocol that performs, based on the request end flag, continuation determination of processing.

7. The security system according to claim 6, wherein the communication protocol includes a NetBIOS Name Service (NBNS), and a Server Message Block (SMB).

8. A security method comprising:
receiving a request from an intruding device attempting an intrusion;
generating, based on characteristic information of virtual dummy resources, a dummy response in response to the request to the dummy resources;
determining a timer value;
controlling, based on the timer value, a request end flag indicating presence or absence of the dummy resources not being transmitted; and
transmitting the dummy response to the intruding device that transmits, based on the request end flag, the request,
wherein,
each of the dummy resources is virtually operated when each corresponding resource turns off, and each of the dummy resources is virtually stopped when each corresponding resource turns on,
when the timer value is not larger than a preset timer threshold value, the controlling further comprises setting the request end flag to a value not being a valid value, and
when the timer value is larger than the preset timer threshold value, the controlling further comprises setting the request end flag to the valid value.

9. The security method according to claim 8, wherein the timer value is determined based on an amount of the dummy response being transmitted.

10. A non-transitory computer-readable storage medium storing a program causing a computer to perform:
packet reception processing of receiving a request from an intruding device attempting an intrusion;
dummy response generation processing of generating, based on characteristic information of virtual dummy resources, a dummy response in response to the request to the dummy resources;
dummy response transmission control processing of determining a timer value and controlling, based on the timer value, a request end flag indicating presence or absence of the dummy resources not being transmitted; and dummy response transmission processing of transmitting the dummy response to the intruding device that transmits, based on the request end flag, the request, wherein, each of the dummy resources is virtually operated when each corresponding resource turns off, and each of the dummy resources is virtually stopped when each corresponding resource turns on, when the timer value is not larger than a preset timer threshold value, the dummy response transmission control processing sets the request end flag to a value not being a valid value, and when the timer value is larger than the preset timer threshold value, dummy response transmission control processing sets the request end flag to the valid value.

* * * * *